(12) United States Patent
Lee et al.

(10) Patent No.: US 10,909,081 B2
(45) Date of Patent: Feb. 2, 2021

(54) APPARATUS FOR MANAGING SENSORY DATA BASED ON CLOUD AND METHOD OF MANAGING SENSORY DATA BASED ON CLOUD

(71) Applicant: UNIVERSITY-INDUSTRY COOPERATION GROUP OF KYUNG HEE UNIVERSITY, Yongin-si (KR)

(72) Inventors: Sung Young Lee, Seongnam-si (KR); Muhammad Bilal Amin, Yongin-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 16/534,485

(22) Filed: Aug. 7, 2019

(65) Prior Publication Data

US 2020/0218698 A1    Jul. 9, 2020

(30) Foreign Application Priority Data

Jan. 8, 2019    (KR) .......................... 10-2019-0002141

(51) Int. Cl.
  *G06F 16/178*    (2019.01)
  *G05B 19/4155*   (2006.01)

(52) U.S. Cl.
  CPC ....... *G06F 16/178* (2019.01); *G05B 19/4155* (2013.01); *G05B 2219/31241* (2013.01)

(58) Field of Classification Search
  CPC ........... G06F 16/2428; G06F 16/24537; G06F 16/3341; G06F 16/35; G06F 16/90344
  See application file for complete search history.

(56) References Cited

U.S. PATENT DOCUMENTS

2002/0161751 A1    10/2002    Mulgund et al.
2012/0191865 A1*    7/2012    Duff ........................ H04L 67/32
                                                              709/228

(Continued)

FOREIGN PATENT DOCUMENTS

JP    2010-230330 A    10/2010
JP    2011-076129 A    4/2011
(Continued)

OTHER PUBLICATIONS

Communication dated Mar. 20, 2020, issued by the Korean Patent Office in counterpart Korean Patent Application No. 10-2019-0002141.
(Continued)

*Primary Examiner* — Truong V Vo
(74) *Attorney, Agent, or Firm* — Sughrue Mion, PLLC (57) ABSTRACT

The present disclosure relates to a cloud-based sensory data management technology. An apparatus for managing sensory data according to one embodiment may include a data collector for receiving user input data and collecting data sensed by a sensory device corresponding to the user input data among one or more sensory devices, a data synchronizer for synchronizing the collected data based on a time frame, and a data persistence part for mapping the synchronized data to a pre-stored data model.

17 Claims, 3 Drawing Sheets

(56) References Cited

U.S. PATENT DOCUMENTS

2013/0073261 A1 3/2013 Kim et al.
2017/0034470 A1* 2/2017 Kleinrock ................ H04N 5/77

FOREIGN PATENT DOCUMENTS

| KR | 10-1584458 B1 | 1/2016 |
| KR | 10-2016-0063110 A | 6/2016 |
| KR | 10-2016-0136555 A | 11/2016 |
| KR | 10-2018-0071932 A | 6/2018 |
| KR | 10-1910285 B1 | 10/2018 |

OTHER PUBLICATIONS

Kang et al., "The Clock Grandmaster Decision Method in Internet of Things (IoT) Network", The Journal of Korea Information Processing Society, vol. 24-1, pp. 1179-1182, Apr. 2017.

Banos et al., Mining Minds Healthcare Framework Based on Big Data:, The Journal of Korea Information and Communications Society, pp. 12-20, Nov. 2015.

Communication dated Oct. 6, 2020, issued by the Japanese Patent Office in counterpart Japanese Application No. 2019-133592.

* cited by examiner

APPARATUS FOR MANAGING SENSORY DATA BASED ON CLOUD AND METHOD OF MANAGING SENSORY DATA BASED ON CLOUD

CROSS-REFERENCE TO RELATED APPLICATION

This application claims priority to Korean Patent Application No. 10-2019-0002141, filed on Jan. 8, 2019 in the Korean Intellectual Property Office, the disclosure of which is incorporated herein by reference.

BACKGROUND OF THE DISCLOSURE

Field of the Disclosure

The present disclosure relates to an apparatus for managing sensory data and a method of managing sensory data. More specifically, the present disclosure relates to a technical idea of collecting, synchronizing, and mapping sensory data received from a plurality of sensors with a communication function in a cloud platform.

Description of the Related Art

Nowadays, with the advent of the Fourth Industrial Revolution, interest in various types of home automation systems and Internet of Things (IoT) technologies is increasing. Sensory devices to which IoT technologies are applied and which can be installed in homes, offices, or the like are continuously being developed.

Since sensory devices applied to home appliances and electronic devices can be connected to each other through a small wireless network or a wired network via a smart home hub device, all sensory devices can be controlled by a single control means, thereby maximizing user convenience.

That is, IoT technologies can be used to implement an environment in which a cluster formed to achieve a specific goal operates consistently. In addition, a specific goal is highly dependent on data accumulated in sensory devices connected to an IoT network, and intelligent processes use data accumulated in sensory devices as a means for context derivation and decision making.

However, at present, clustering of sensory devices operating in an IoT communication environment is performed by the manufacturer of the sensory devices. Therefore, it is difficult to employ standard sensory data.

In addition, since sensory data collection from sensory devices is performed through the application programming interface (API) of a manufacturer, a platform for collecting sensory data is not dynamic and has low scalability, and acquisition of configurable data is difficult.

RELATED DOCUMENTS

Patent Documents

Korean Patent Application Publication No. 10-2016-0136555 "SET-TOP BOX FOR ACQUIRING USER INFORMATION USING MULTI-MODAL INFORMATION, MANAGEMENT SERVER FOR MANAGING USER INFORMATION ACQUIRED BY SET-TOP BOX, METHOD USING SET-TOP BOX AND MANAGEMENT SERVER, AND COMPUTER-READABLE RECORDING MEDIUM USING SET-TOP BOX AND MANAGEMENT SERVER"

Korean Patent No. 10-1910285 "INTELLIGENT SMART AGING SERVICE CONFIGURATION SYSTEM AND METHOD OF CONFIGURING INTELLIGENT SMART AGING SERVICE"

SUMMARY OF THE DISCLOSURE

Therefore, the present disclosure has been made in view of the above problems, and it is an object of the present disclosure to provide an apparatus for managing sensory data capable of easily collecting and managing configurable sensory data and a method of managing sensory data that allows configurable sensory data to be easily collected and managed.

It is another object of the present disclosure to provide an apparatus for managing sensory data capable of accurately collecting and managing meaningful sensory data in a dynamic and rapidly changing smart environment and a method of managing sensory data that allows meaningful sensory data to be accurately collected and managed in a dynamic and rapidly changing smart environment.

In accordance with the present disclosure, the above and other objects can be accomplished by the provision of an apparatus for managing sensory data including a data collector for receiving user input data and collecting data sensed by a sensory device corresponding to the user input data among one or more sensory devices, a data synchronizer for synchronizing the collected data based on a time frame, and a data persistence part for mapping the synchronized data to a pre-stored data model.

According to one aspect, the sensory devices may include at least one of a sensor, an electronic product, and an Internet of Things (IoT) hub, which are connected through IoT communication.

According to one aspect, the data collector may register device name information, device type information, and universal unique identification (UUID) information of each of the sensory devices.

According to one aspect, the user input data may include at least one of device registration information, data acquisition protocol information, communication frequency information, confidence level information of devices, and data type information.

According to one aspect, the data collector may apply the user input data to a dynamic model or a static model, and may collect data sensed by a sensory device corresponding to analysis results through the applied model.

According to one aspect, when the number of the sensory devices is greater than or equal to a predetermined number, the data collector may apply the dynamic model, and when the number of the sensory devices is less than or equal to a predetermined number, the data collector may apply the static model.

According to one aspect, the data collector may apply any one of the dynamic model and the static model based on model information included in the user input data.

According to one aspect, the static model may be a model for collecting data sensed by a sensory device corresponding to information included in the user input data.

According to one aspect, the dynamic model may include at least one of a semantic model for performing a semantic analysis based on information included in the user input data and collecting data sensed by a sensory device corresponding to results of the semantic analysis and an object oriented model for performing an object oriented analysis based on information included in the user input data and collecting data sensed by a sensory device corresponding to results of the object oriented analysis.

According to one aspect, the apparatus for managing sensory data may further include a data buffer for separately storing the collected data for each of sensory devices corresponding to the collected data.

According to one aspect, when all data sensed by a sensory device corresponding to the user input data for a predetermined time frame is collected, the data synchronizer may synchronize the collected data using a complete synchronization (complete-sync) method, and when one or more pieces of data sensed by a sensory device corresponding to the user input data for the predetermined time frame are missing, the data synchronizer may synchronize the collected data using an incomplete synchronization (incomplete-sync) method.

According to one aspect, the complete synchronization method may be a method of encapsulating all data collected for the predetermined time frame into a single message.

According to one aspect, the incomplete synchronization method may include at least one of an eager method in which only data collected for the predetermined time frame is encapsulated into a message and a rendezvous method in which data corresponding to the missing data among data stored in the data buffer and data collected for the predetermined time frame are encapsulated into a single message.

According to one aspect, the data persistence part may map a message encapsulated through any one of the complete synchronization method and the incomplete synchronization method to the pre-stored data model.

According to one aspect, the pre-stored data model may be formed to be distinguishable for each user or each environment, and the synchronized data may be mapped to a data model corresponding to user information or environment information about the synchronized data.

In accordance with another aspect of the present disclosure, there is provided a method of managing sensory data including a step of receiving user input data by a data collector and collecting, by the data collector, data sensed by a sensory device corresponding to the user input data among one or more sensory devices, a step of synchronizing, by a data synchronizer, the collected data based on a time frame, and a step of mapping, by a data persistence part, the synchronized data to a pre-stored data model.

According to one aspect, in the step of collecting, the data collector may apply the user input data to a dynamic model or a static model, and may collect data sensed by a sensory device corresponding to analysis results through the applied model.

According to one aspect, the method of managing sensory data may further include a step of separately storing, by a data buffer, the collected data for each of sensory devices corresponding to the collected data.

According to one aspect, in the step of synchronizing, when all data sensed by a sensory device corresponding to the user input data for a predetermined time frame is collected, the data synchronizer may synchronize the collected data using a complete synchronization (complete-sync) method, and when one or more pieces of data sensed by a sensory device corresponding to the user input data for the predetermined time frame are missing, the data synchronizer may synchronize the collected data using an incomplete synchronization (incomplete-sync) method.

DETAILED DESCRIPTION OF THE DISCLOSURE

Specific structural and functional descriptions of embodiments according to the concept of the present disclosure disclosed herein are merely illustrative for the purpose of explaining the embodiments according to the concept of the present disclosure. Furthermore, the embodiments according to the concept of the present disclosure can be implemented in various forms and the present disclosure is not limited to the embodiments described herein.

The embodiments according to the concept of the present disclosure may be implemented in various forms as various modifications may be made. The embodiments will be described in detail herein with reference to the drawings. However, it should be understood that the present disclosure is not limited to the embodiments according to the concept of the present disclosure, but includes changes, equivalents, or alternatives falling within the spirit and scope of the present disclosure.

It should be understood that, although the terms first, second, third etc. may be used herein to describe various elements, these elements should not be limited by these terms. These terms are only used to distinguish one element from another element. For example, a first element may be termed a second element and a second element may be termed a first element without departing from the teachings of the present disclosure.

It should be understood that when an element is referred to as being "connected to" or "coupled to" another element, the element may be directly connected or coupled to the other element or intervening elements may be present. In contrast, when an element is referred to as being "directly connected to" or "directly coupled to" another element, there are no intervening elements present. Expressions that describe the relationship between components, such as "between" and "directly adjacent to", should also be construed as described above.

The terms used in the present specification are used to explain a specific exemplary embodiment and not to limit the present inventive concept. Thus, the expression of singularity in the present specification includes the expression of plurality unless clearly specified otherwise in context. Also, terms such as "include" or "comprise" should be construed as denoting that a certain characteristic, number, step, operation, constituent element, component or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present disclosure will be described in detail with reference to the accompanying drawings. However, the scope of the present disclosure is not limited by these embodiments. Like reference numerals in the drawings denote like elements.

Figure 1:
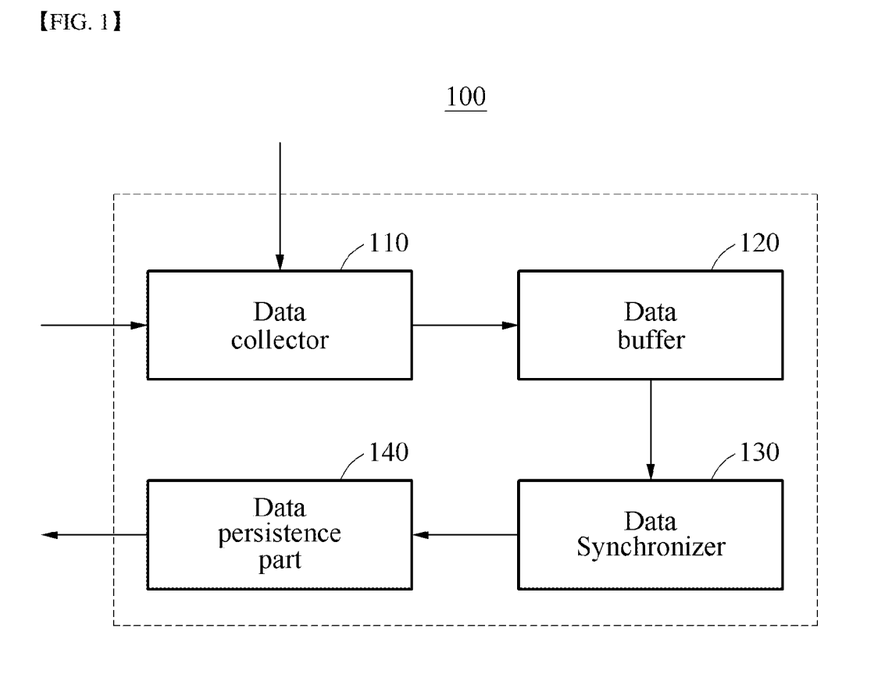
FIG. 1 is a drawing for explaining an apparatus for managing sensory data according to one embodiment.

FIG. 1 is a drawing for explaining an apparatus for managing sensory data according to one embodiment.

Referring to FIG. 1, an apparatus 100 for managing sensory data according to one embodiment is configurable in a dynamic and rapidly changing smart environment and may easily collect and manage meaningful sensory data.

The apparatus 100 for managing sensory data according to one embodiment may include a data collector 110, a data synchronizer 130, and a data persistence part 140.

In addition, the apparatus 100 for managing sensory data according to one embodiment may further include a data buffer 120 for storing data collected in the data collector 110 and transmitting the stored data to the data synchronizer 130.

For example, the apparatus 100 for managing sensory data according to one embodiment may be implemented on a cloud platform.

Specifically, the data collector 110 according to one embodiment may receive user input data, and may collect data sensed by a sensory device corresponding to the user input data among one or more sensory devices.

According to one aspect, the sensory devices may include at least one of a sensor, an electronic product, and an IoT hub, which are connected through Internet of Things (IoT) communication.

More specifically, the sensory devices may include at least one of a smartphone, a camera, a speaker, a microphone, a mobile terminal, a temperature sensor, a humidity sensor, a luminance sensor, a refrigerator, a washing machine, a gas range, a television (TV), a closed circuit television (CCTV), and an IoT hub, which have a communication function. However, the sensory devices according to one embodiment are not limited to the above-described example, and may include various sensory devices and electronic devices, which have a communication function.

In addition, the IoT hub may collect data (sensory data) sensed by each sensory device having a communication function, and may transmit the collected data to the data collector 110.

For example, the data sensed by each sensory device may include multi-modal information indicative of a measurable physical quantity capable of determining the state of an interior space in which each sensory device is located.

According to one aspect, the user input data may include at least one of device registration information, data acquisition protocol information, communication frequency information, confidence level information of devices, and data type information.

For example, the user input data may be information directly input by a user to collect the data of a meaningful sensory device.

According to one aspect, the data collector 110 may register at least one of device name information, device type information, and universal unique identification (UUID) information of each sensory device.

That is, the data collector 110 may improve security by performing authentication operation of each sensory device through previously registered information.

In addition, the data collector 110 may register information on each of a plurality of sensory devices collecting sensory data in advance, may load the registered information before data collection operation, and may review available acquisition strategies based on the loaded information.

For example, the data collector 110 may determine strategies for collection of data sensed by a sensory device in consideration of environment information, such as number information and type information of currently connected sensory devices among registered sensory devices and user input information, and situation information.

More specifically, the data collector 110 may apply user input data to a dynamic model or a static model according to environment information and situation information, and may collect data sensed by sensory devices corresponding to analysis results obtained using the applied model.

According to one aspect, when the number of the sensory devices is greater than or equal to a predetermined number, the data collector 110 may apply a dynamic model. When the number of the sensory devices is less than or equal to a predetermined number, the data collector 110 may apply a static model.

In addition, the data collector 110 may apply any one of a dynamic model and a static model based on model information included in user input data.

That is, user input data may further include model information for determining which one of the dynamic model and the static model is to be applied. That is, a user may directly select a model to be applied.

According to one aspect, the data collector 110 may perform machine learning on user input data, and may apply a suitable model to the received user input data based on the results of the machine learning.

According to one aspect, the static model may be a model for collecting data sensed by a sensory device corresponding to information included in user input data.

More specifically, when user input data including data type information, communication frequency information, and confidence level information of devices is received, the data collector 110 may deduce a sensory device corresponding to at least one of data type information, communication frequency information, and confidence level information of devices included in the user input data among one or more sensory devices, and may apply a static model for collecting data sensed by the deduced sensory device.

According to one aspect, the dynamic model may include at least one of a semantic model and an object oriented model.

More specifically, the semantic model may be a model for performing a semantic analysis based on information included in user input data in the data collector 110 and collecting data sensed by a sensory device corresponding to the results of the semantic analysis.

In addition, the object oriented model may be a model for performing an object oriented analysis based on information included in user input data in the data collector 110 and collecting data sensed by a sensory device corresponding to the results of the object oriented analysis.

That is, the data collector 110 may extract semantic information through information included in user input data, may perform a semantic analysis using the extracted information, and may apply a semantic model for collecting data sensed by a sensory device corresponding to the analysis results.

In addition, the data collector 110 may extract object oriented information through information included in user input data, may perform an object oriented analysis using the extracted information, and may apply an object oriented model for collecting data sensed by a sensory device corresponding to the analysis results.

According to one aspect, the data buffer 120 may store data collected by the data collector 110 separately for each sensory device corresponding to the collected data.

For example, when the data collector 110 collects data from a TV device and an IoT hub device, the data buffer 120 may separately store the data so that data collected from the TV device is stored in a buffer allocated to the TV device and data collected from the IoT hub device is stored in a buffer allocated to the IoT hub device.

In addition, the data storage space of a buffer for each sensory device provided in the data buffer 120 may be dynamically controlled.

In addition, the data synchronizer 130 according to one embodiment may synchronize data collected by the data collector 110 based on a time frame.

According to one aspect, the data synchronizer 130 may receive data collected by the data collector 110 through the data buffer 120.

According to one aspect, when all data sensed by a sensory device corresponding to user input data for a predetermined time frame is collected, the data synchronizer 130 may synchronize the collected data using a complete synchronization (complete-sync) method.

In addition, when one or more pieces of data sensed by a sensory device corresponding to user input data for a predetermined time frame are missing, the data synchronizer 130 may synchronize the collected data using an incomplete synchronization (incomplete-sync) method.

According to one aspect, the complete synchronization method may be a method of encapsulating all data collected for a predetermined time frame into a single message.

More specifically, when sensory devices corresponding to user input data as data collection targets are a TV device and an IoT hub device and a predetermined time frame is 5 s to 10 s, when all data sensed by the TV device and the IoT hub device is collected during the time frame of 5 s to 10 s, the data synchronizer 130 may encapsulate the collected data of the TV device and the IoT hub device into a single message.

According to one aspect, the incomplete synchronization method may include at least one of an eager method and a rendezvous method.

More specifically, the eager method may be a method of encapsulating only data collected for a predetermined time frame into a message.

More specifically, when sensory devices corresponding to user input data as data collection targets are a TV device and an IoT hub device and a predetermined time frame is 5 s to 10 s, when only data sensed by the TV device is collected during the time frame of 5 s to 10 s, the data synchronizer 130 may apply the eager method of encapsulating only the collected data of the TV device into a single message, with the exception of the missing data of the IoT hub device.

In addition, the rendezvous method may encapsulate data corresponding to missing data among data stored in the data buffer 120 and data collected for a predetermined time frame into a single message.

More specifically, when sensory devices corresponding to user input data as data collection targets are a TV device and an IoT hub device and a predetermined time frame is 5 s to 10 s, when only data sensed by the TV device is collected during the time frame of 5 s to 10 s, the data synchronizer 130 may replace the missing data of the IoT hub device with last stored data among the data of a buffer allocated to the IoT hub device in the data buffer 120, and may encapsulate the replaced data of the IoT hub device and the received data of the TV device into a single message.

According to one aspect, the data synchronizer 130 may apply any one of the eager method and the rendezvous method based on synchronization mode information included in user input data.

That is, user input data may include synchronization mode information for determining which one of the eager method and the rendezvous method is to be applied. That is, a user may directly select the method to be applied when incomplete synchronization is performed.

In addition, the data persistence part 140 according to one embodiment may map data synchronized through the data synchronizer 130 to a pre-stored data model.

That is, the data persistence part 140 according to one embodiment may map a message encapsulated through any one of the complete synchronization method and the incomplete synchronization method in the data synchronizer 130 to a pre-stored data model.

According to one aspect, a pre-stored data model may be formed for each user or environment, and synchronized data may be mapped to a data model corresponding to user or environment information regarding synchronized data.

That is, the data persistence part 140 according to one embodiment may map synchronized data to a data model corresponding to the user information or environment information of synchronized data among a plurality of data models classified by users or environments.

According to one aspect, the environment information may be information deduced from user input data.

Figure 2:
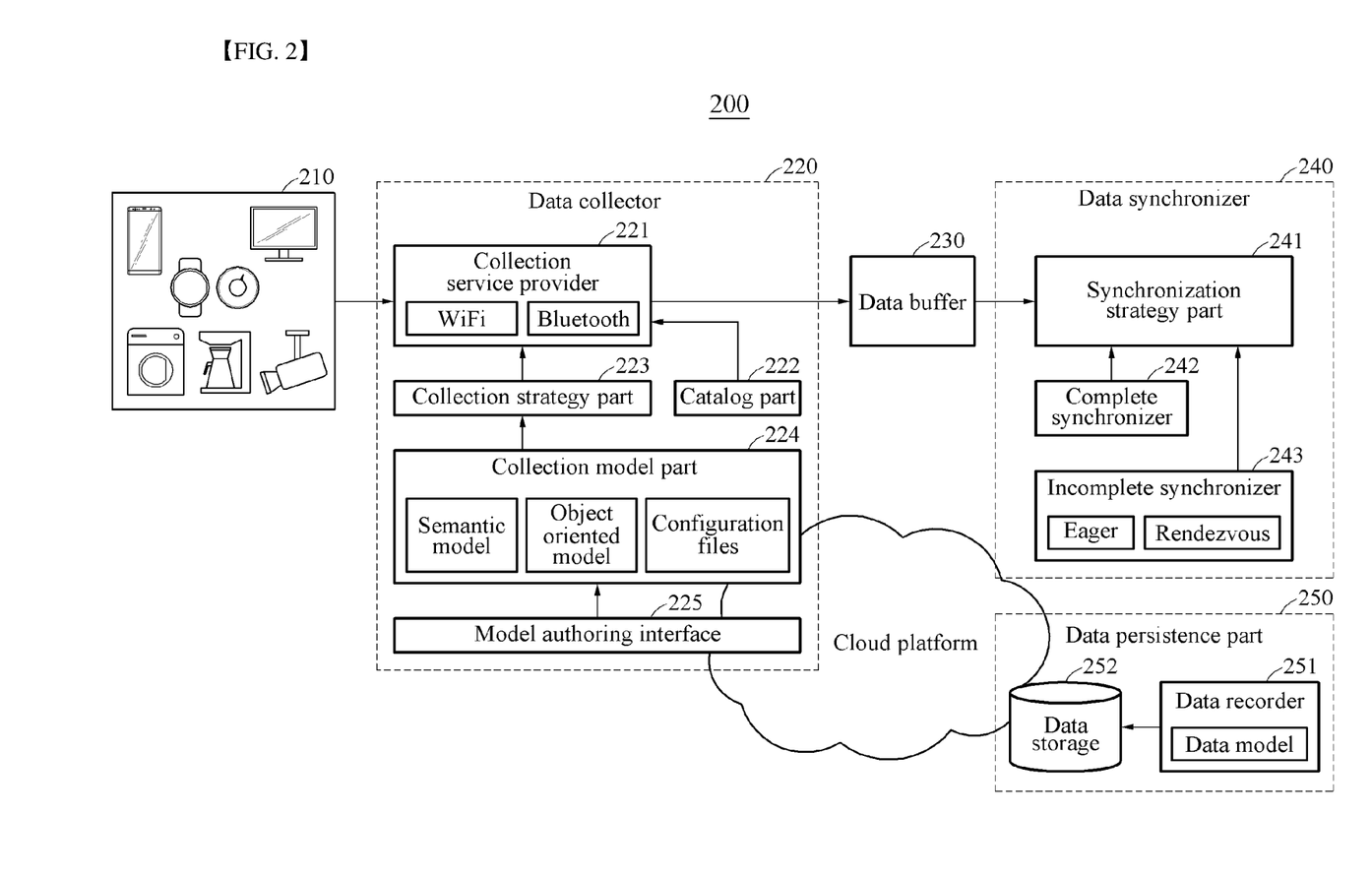
FIG. 2 illustrates an example of implementing an apparatus for managing sensory data according to one embodiment.

FIG. 2 illustrates an example of implementing an apparatus for managing sensory data according to one embodiment.

That is, FIG. 2 illustrates an example of implementing the apparatus for managing sensory data according to one embodiment described in FIG. 1. Hereinafter, description overlapping with FIG. 1 will be omitted.

Referring to FIG. 2, an apparatus 200 for managing sensory data according to one embodiment may include a data collector 220, a data buffer 230, a data synchronizer 240, and a data persistence part 250.

In addition, the apparatus 200 for managing sensory data according to another embodiment may be implemented on a cloud platform.

Specifically, the data collector 220 according to another embodiment may receive user input data, and may collect data sensed by a sensory device corresponding to user input data among one or more sensory devices 210.

The data collector 220 may further include a collection service provider 221, a catalog part 222, a collection strategy part 223, a collection model part 224, and a model authoring interface 225.

More specifically, the collection service provider 221 may apply user input data received through the model authoring interface 225 to a model determined in the collection strategy part 223, and may collect data sensed by a sensory device corresponding to analysis results using the applied model.

According to one aspect, the collection service provider 221 may further include a Wi-Fi module and a Bluetooth module to perform communication with the sensory devices 210.

The catalog part 222 may register at least one of device name information, device type information, and universal unique identification (UUID) information of all available sensory devices among the sensory devices 210, and may support sending and receiving of secure data.

According to one aspect, the catalog part 222 may provide registered profile information to the collection service provider 221 prior to data collection operation.

The collection model part 224 may store configuration files corresponding to a static model, a semantic model corresponding to a dynamic model, and an object oriented model.

According to one aspect, the configuration files corresponding to a static model may include information related to at least one of device registration information, data acquisition protocol information, communication frequency information, confidence level information of devices, and data type information.

In addition, the semantic model corresponding to a dynamic model and the object oriented model may also include information related to at least one of device registration information, data acquisition protocol information, communication frequency information, confidence level information of devices, and data type information.

According to one aspect, the static model and the dynamic model may be configured at runtime. The static model may be applied under an environment in which a limited number of sensory devices is present, and the dynamic model may be applied under an environment in which a plurality of sensory devices is present.

The model authoring interface 225 may receive user input data from a user, and the user input data may include at least one of device registration information, data acquisition protocol information, communication frequency information, confidence level information of devices, and data type information.

According to one aspect, the model authoring interface 225 may receive situation information from a user.

For example, the situation information may include information for measuring air quality, information on the presence or absence of a newborn baby, and information on the presence or absence of an adult in a space in which the sensory devices 210 are located.

In addition, the situation information may be deduced from user input data received from a user.

The collection strategy part 223 may determine whether a static model is applied or whether a dynamic model is applied through any one of user input data received from a user and situation information, and may provide the determined model to the collection service provider 221.

As a result, the data collector 220 may improve a sensing function in an IoT-cloud communication environment, and may collect meaningful data from sensory devices according to situations.

The data buffer 230 may store data collected by the data collector 220 separately for each sensory device corresponding to the collected data.

According to one aspect, data stored in the data buffer 230 separately for each sensory device may exist in an independent clock.

The data synchronizer 240 may receive data collected by the data collector 220 through the data buffer 230, and may synchronize the received data based on a time frame.

The data synchronizer 240 may include a synchronization strategy part 241, a complete synchronizer 242, and an incomplete synchronizer 243.

More specifically, when all data sensed by a sensory device corresponding to user input data for a predetermined time frame is collected, the synchronization strategy part 241 may synchronize the collected data through the complete synchronizer 242 using a complete synchronization (complete-sync) method.

In addition, when one or more pieces of data sensed by a sensory device corresponding to user input data for a predetermined time frame are missing, the synchronization strategy part 241 may synchronize the collected data through the incomplete synchronizer 243 using an incomplete synchronization (incomplete-sync) method.

According to one aspect, the complete synchronizer 242 may store data for implementing a complete synchronization method, and the incomplete synchronizer 243 may store data for implementing an incomplete synchronization method.

More specifically, the incomplete synchronizer 243 may store data for implementing synchronization of an eager method in which only data collected for a predetermined time frame is encapsulated into a message and data for implementing synchronization of a rendezvous method in which data corresponding to missing data among data stored in the data buffer 230 and data collected for a predetermined time frame are encapsulated into a single message.

According to one aspect, the synchronization strategy part 241 may encapsulate data collected through the complete synchronization method or the incomplete synchronization method described above into a single message.

The data persistence part 250 according to one embodiment may map data synchronized through the data synchronizer 240 to a pre-stored data model.

That is, the data persistence part 250 according to one embodiment may map a message encapsulated in the data synchronizer 240 through any one of the complete synchronization method and the incomplete synchronization method to a pre-stored data model.

The data persistence part 250 may include a data recorder 251 and a data storage 252. More specifically, the data recorder 251 may receive an encapsulated message from the data synchronizer 240, and may map the received message to a pre-stored data model.

In addition, the data storage 252 may store at least one of a received message and a data model to which the received message is mapped.

For example, the data storage 252 may include at least one of a storage of a relational database management system (RDBMS) and a storage based on big data.

Figure 3:
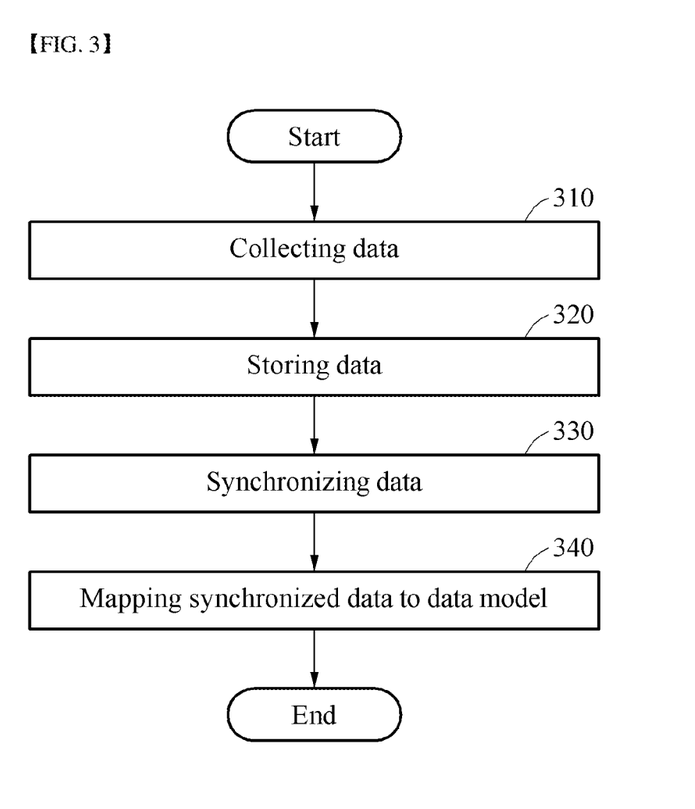
FIG. 3 is a flowchart for explaining a method of managing sensory data according to one embodiment.

FIG. 3 is a flowchart for explaining a method of managing sensory data according to one embodiment.

That is, FIG. 3 is a flowchart for explaining a method of managing sensory data using the apparatus for managing sensory data according to one embodiment described in FIGS. 1 and 2. Hereinafter, description overlapping with FIGS. 1 and 2 will be omitted.

Referring to FIG. 3, in the method of managing sensory data according to one embodiment, in Step 310, a data collector may receive user input data and data sensed by a sensory device corresponding to the user input data among one or more sensory devices.

According to one aspect, in the method of managing sensory data according to one embodiment, in Step 310, the data collector may apply user input data to a dynamic model or a static model, and may collect data sensed by a sensory device corresponding to analysis results through the applied model.

According to one aspect, in the method of managing sensory data according to one embodiment, in Step 320, a data buffer may separately store the collected data for each of sensory devices corresponding to the collected data.

According to the method of managing sensory data according to one embodiment, in Step 330, a data synchronizer may synchronize data collected by a data collector based on a time frame.

According to one aspect, in the method of managing sensory data according to one embodiment, in Step 330, the data synchronizer may receive data collected by the data collector through the data buffer.

According to one aspect, in the method of managing sensory data according to one embodiment, in Step 330, when all data sensed by a sensory device corresponding to user input data for a predetermined time frame is collected, the data synchronizer may synchronize the collected data using a complete synchronization (complete-sync) method.

In addition, in the method of managing sensory data according to one embodiment, in Step 330, when one or more pieces of data sensed by a sensory device corresponding to user input data for a predetermined time frame are missing, the collected data may be synchronized using an incomplete synchronization (incomplete-sync) method.

In the method of managing sensory data according to one embodiment, in Step 340, a data persistence part may map the synchronized data to a pre-stored data model.

Therefore, when the present disclosure is used, configurable sensory data may be easily collected and managed.

In addition, meaningful sensory data may be accurately collected and managed in a dynamic and rapidly changing smart environment.

According to one embodiment, configurable sensory data can be easily collected and managed.

According to one embodiment, meaningful sensory data can be accurately collected and managed in a dynamic and rapidly changing smart environment.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

DESCRIPTION OF SYMBOLS

100: APPARATUS FOR MANAGING SENSORY DATA
110: DATA COLLECTOR
120: DATA BUFFER
130: DATA SYNCHRONIZER
140: DATA PERSISTENCE PART

What is claimed is:

1. An apparatus for managing sensory data, comprising:
a data collector for receiving user input data and collecting data sensed by a sensory device corresponding to the user input data among one or more sensory devices;
a data synchronizer for synchronizing the collected data based on a time frame; and
a data persistence part for mapping the synchronized data to a pre-stored data model,
wherein the data collector is configured to:
collect data sensed by a sensory device, among the sensory devices, corresponding to results of analyzing the user input data using an applied model,
register at least one of device name information, device type information, and universal unique identification (UUID) information of all available sensory devices among the sensory devices, and
store configuration files corresponding to a static model, a semantic model and an object oriented model, wherein the semantic model and the object oriented model correspond to a dynamic model.

2. The apparatus according to claim 1, wherein the sensory devices comprise at least one of a sensor, an electronic product, and an Internet of Things (IoT) hub, which are connected through IoT communication.

3. The apparatus according to claim 1, wherein the data collector registers device name information, device type information, and universal unique identification (UUID) information of each of the sensory devices.

4. The apparatus according to claim 1, wherein the user input data comprises at least one of device registration information, data acquisition protocol information, communication frequency information, confidence level information of devices, and data type information.

5. The apparatus according to claim 1, wherein the data collector applies the user input data to the dynamic model or the static model, and collects data sensed by a sensory device corresponding to analysis results through the applied model.

6. The apparatus according to claim 5, wherein, when the number of the sensory devices is greater than or equal to a predetermined number, the data collector applies the dynamic model, and when the number of the sensory devices is less than or equal to a predetermined number, the data collector applies the static model.

7. The apparatus according to claim 5, wherein the data collector applies any one of the dynamic model and the static model based on model information comprised in the user input data.

8. The apparatus according to claim 5, wherein the static model is a model for collecting data sensed by a sensory device corresponding to information comprised in the user input data, and
the dynamic model comprises at least one of the semantic model and the object oriented model, wherein the semantic model is a model for performing a semantic analysis based on information comprised in the user input data and collecting data sensed by a sensory device corresponding to results of the semantic analysis and the object oriented model is a model for performing an object oriented analysis based on information comprised in the user input data and collecting data sensed by a sensory device corresponding to results of the object oriented analysis.

9. The apparatus according to claim 1, wherein the apparatus further comprises a data buffer for separately storing the collected data for each of sensory devices corresponding to the collected data.

10. The apparatus according to claim 9, wherein, when all data sensed by a sensory device corresponding to the user input data for a predetermined time frame is collected, the data synchronizer synchronizes the collected data using a complete synchronization (complete-sync) method, and when one or more pieces of data sensed by a sensory device corresponding to the user input data for the predetermined time frame are missing, the data synchronizer synchronizes the collected data using an incomplete synchronization (incomplete-sync) method.

11. The apparatus according to claim 10, wherein the complete synchronization method is a method of encapsulating all data collected for the predetermined time frame into a single message, and the incomplete synchronization method comprises at least one of an eager method in which only data collected for the predetermined time frame is encapsulated into a message and a rendezvous method in which data corresponding to the missing data among data stored in the data buffer and data collected for the predetermined time frame are encapsulated into a single message.

12. The apparatus according to claim 11, wherein the data persistence part maps a message encapsulated through any one of the complete synchronization method and the incomplete synchronization method to the pre-stored data model.

13. The apparatus according to claim 1, wherein the pre-stored data model is formed to be distinguishable for each user or each environment.

14. A method of managing sensory data, comprising:

receiving user input data by a data collector and collecting, by the data collector, data sensed by a sensory device corresponding to the user input data among one or more sensory devices;

synchronizing, by a data synchronizer, the collected data based on a time frame; and mapping, by a data persistence part, the synchronized data to a pre-stored data model, wherein the receiving of the user input data comprises:

collecting data sensed by a sensory device, among the sensory devices, corresponding to results of analyzing the user input data using an applied model, registering at least one of device name information, device type information, and universal unique identification (UUID) information of all available sensory devices among the sensory devices, and storing configuration files corresponding to a static model, a semantic model and an object oriented model, wherein the semantic model and the object oriented model correspond to a dynamic model.

15. The method according to claim 14, wherein, in the collecting, the data collector applies the user input data to the dynamic model or the static model, and collects data sensed by a sensory device corresponding to analysis results through the applied model.

16. The method according to claim 14, wherein the method further comprises separately storing, by a data buffer, the collected data for each of sensory devices corresponding to the collected data.

17. The method according to claim 14, wherein, in the synchronizing, when all data sensed by a sensory device corresponding to the user input data for a predetermined time frame is collected, the data synchronizer synchronizes the collected data using a complete synchronization (complete-sync) method, and when one or more pieces of data sensed by a sensory device corresponding to the user input data for the predetermined time frame are missing, the data synchronizer synchronizes the collected data using an incomplete synchronization (incomplete-sync) method.

* * * * *